United States Patent [19]

Figueroa

[11] Patent Number: 5,350,029
[45] Date of Patent: Sep. 27, 1994

[54] AUTOMOBILE EMERGENCY ACCESSORY

[76] Inventor: Hector D. Figueroa, 1410 New Haven Ave., Far Rockaway, N.Y. 11691

[21] Appl. No.: 56,924

[22] Filed: May 5, 1993

[51] Int. Cl.⁵ ............................................. B62D 59/04
[52] U.S. Cl. ...................................... 180/11; 180/15; 280/502; 280/511
[58] Field of Search ..................... 180/11, 12, 13, 15, 180/16, 19.1, 198, 200, 202, 904; 280/500, 502, 491.5, 495, 498, 501, 505, 503, 511

[56] References Cited

U.S. PATENT DOCUMENTS

| | | | |
|---|---|---|---|
| 3,212,595 | 10/1965 | Mathews et al. | 180/19.1 |
| 3,583,510 | 6/1971 | Hastings | 180/11 |
| 4,077,646 | 3/1978 | Watkins | 280/511 |
| 4,264,086 | 4/1981 | Espejo | 280/502 |
| 4,289,212 | 9/1981 | Immel | 180/19.1 |
| 4,346,772 | 8/1982 | Clifft | 180/11 |
| 4,468,046 | 8/1984 | Rutherford | 280/491.5 |
| 5,141,067 | 8/1992 | Diggs | 180/11 |

FOREIGN PATENT DOCUMENTS

| | | | |
|---|---|---|---|
| 0971513 | 1/1951 | France | 180/15 |
| 0616304 | 2/1961 | Italy | 280/502 |

*Primary Examiner*—Margaret A. Focarino
*Assistant Examiner*—Anne Marie Boehler
*Attorney, Agent, or Firm*—Hugh E. Smith

[57] ABSTRACT

Nearly everyone who drives an automobile has experienced engine failure or other problems with the transmission, cooler lines, drive shaft, differential or electrical components or has run out of gas at one time or another. The disabled car is immobilized until the driver is fortunate enough to obtain outside help to tow or push the car to a place for repair. The present invention comprises an accessory which can be carried in the vehicle trunk and which, when connected to the rear of the vehicle, will push the vehicle to safety. It comprises a motorized wheeled unit controllable from the disabled vehicle which fastens to the rear bumper or to a trailer hitch (if the vehicle has one) or to a temporary, removable type trailer hitch of the disabled vehicle and pushes it while the driver steers in a normal manner.

6 Claims, 3 Drawing Sheets

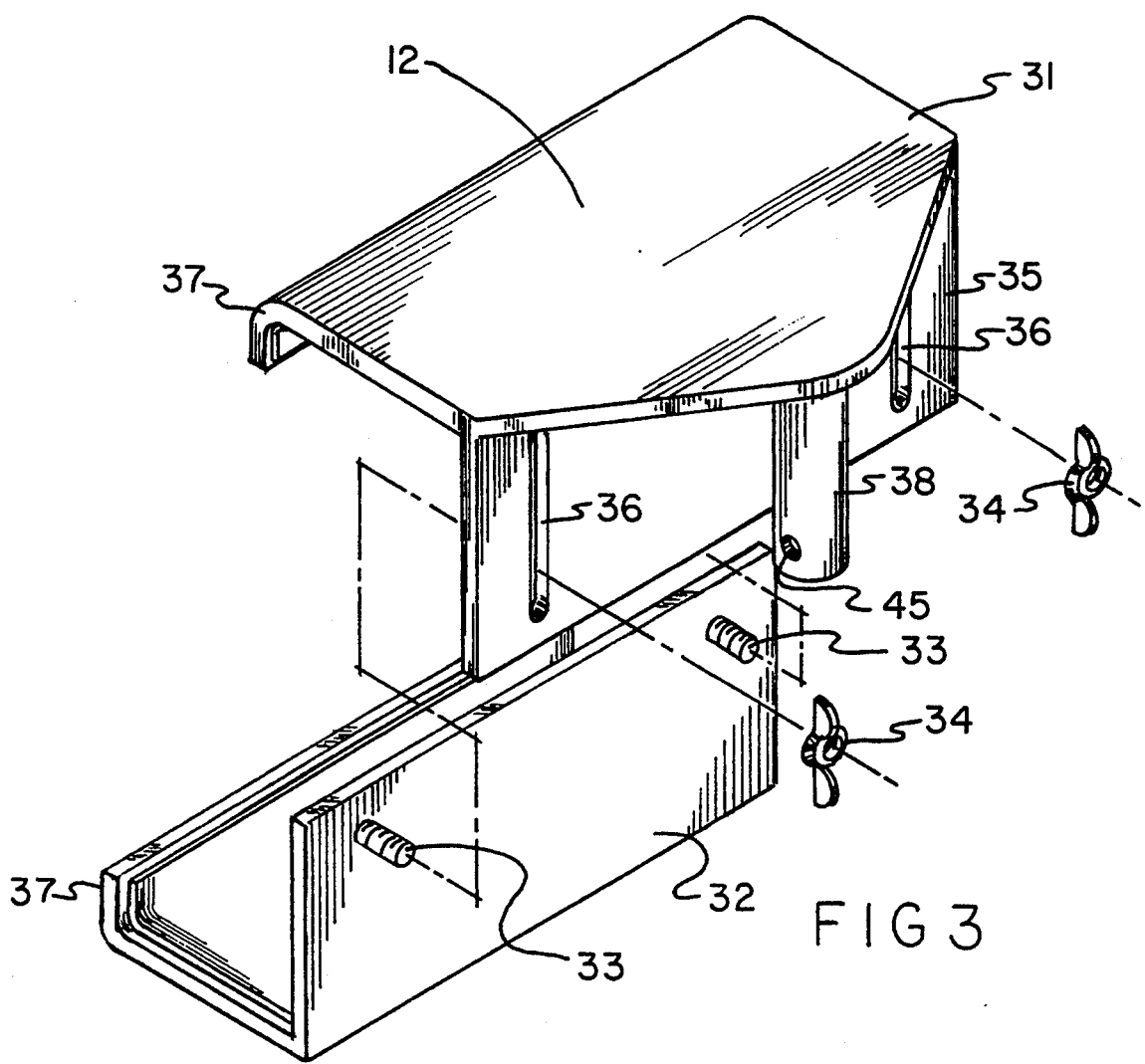
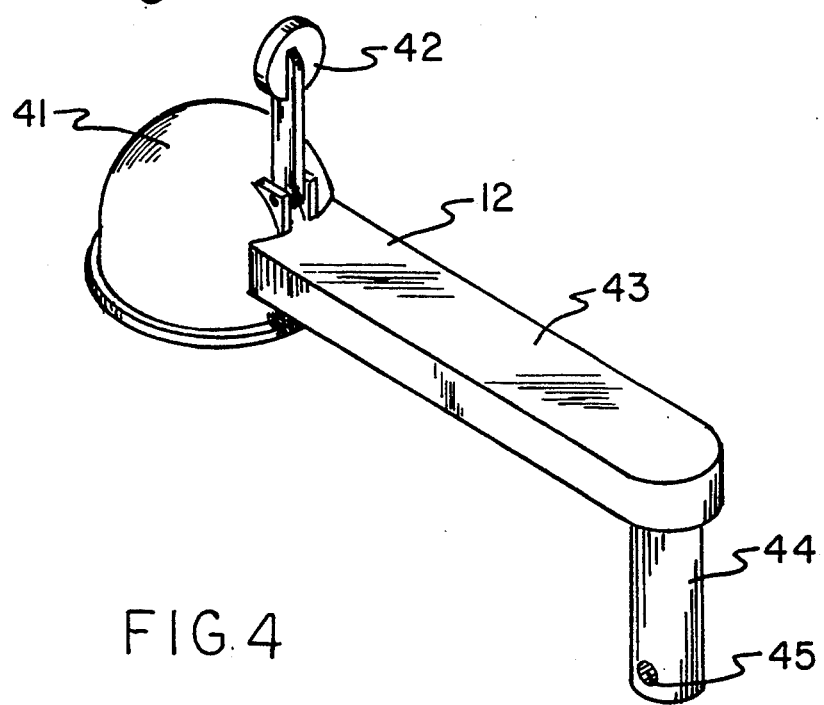

AUTOMOBILE EMERGENCY ACCESSORY

BACKGROUND OF THE INVENTION

1. Field of the Invention

The present invention relates to automobiles and more particularly pertains to a motorized accessory which may be used to provide emergency motive power for a disabled vehicle.

2. Description of the Prior Art

The use of towing devices is known in the prior art. More specifically, such devices heretofore devised and utilized for the purpose of towing vehicles are known to consist basically of familiar, expected and obvious structural configurations, notwithstanding the myriad of designs encompassed by the crowded prior art which have been developed for the fulfillment of countless objectives and requirements. These devices are usually connected to a conventional motor vehicle, i.e. tow trucks, which is separate and distinct from the disabled vehicle to be towed.

In this respect, the accessory according to the present invention substantially departs from the conventional concepts and designs of the prior art, and in so doing provides an apparatus primarily developed for the purpose of a self-help means of moving a disabled motor vehicle.

The prior art, while not directly pertinent to this invention, is directed mainly to towing bars or hitches for vehicles, e.g. U.S. Pat. Nos. 3,482,853; 4,871,183; 3,865,405; 4,078,821; and 4,744,583.

SUMMARY OF THE INVENTION

In view of the foregoing disadvantages inherent in the known types of towing devices now present in the prior art, the present invention provides an improved emergency motive unit. As such, the general purpose of the present invention, which will be described subsequently in greater detail, is to provide a new and improved automobile motive device and method which has all the advantages of the prior art and none of the disadvantages.

To attain this, the present invention provides a compact, motorized, uni-wheel device adapted to fasten to the rear of a disabled vehicle and to provide emergency motive power for such vehicle without resort to conventional towing services. The device can be carried internally of the vehicle until needed and, once installed, is controllable by the driver of the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile emergency accessory which has all the advantages of the prior art towing devices and none of the disadvantages.

It is another object of the present invention to provide a new and improved automobile emergency accessory which may be easily and efficiently manufactured and marketed.

It is a further object of the present invention to provide a new and improved automobile emergency accessory which is of a durable and reliable construction.

An even further object of the present invention is to provide a new and improved automobile emergency accessory which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved means for moving a disabled vehicle which provides in the apparatuses and methods of the prior art some of the advantages thereof, while simultaneously overcoming some of the disadvantages normally associated therewith.

Still another object of the present invention is to provide a new and improved emergency device for use with a vehicle which has experienced motor failure, or is incapacitated for other reasons, yet is able to roll on its wheels when pushed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 and 4 illustrate means used to fasten the device of FIG. 2 to the bumper or trailer hitch respectively of a disabled vehicle.

DESCRIPTION OF THE PREFERRED EMBODIMENT

Figure 1:
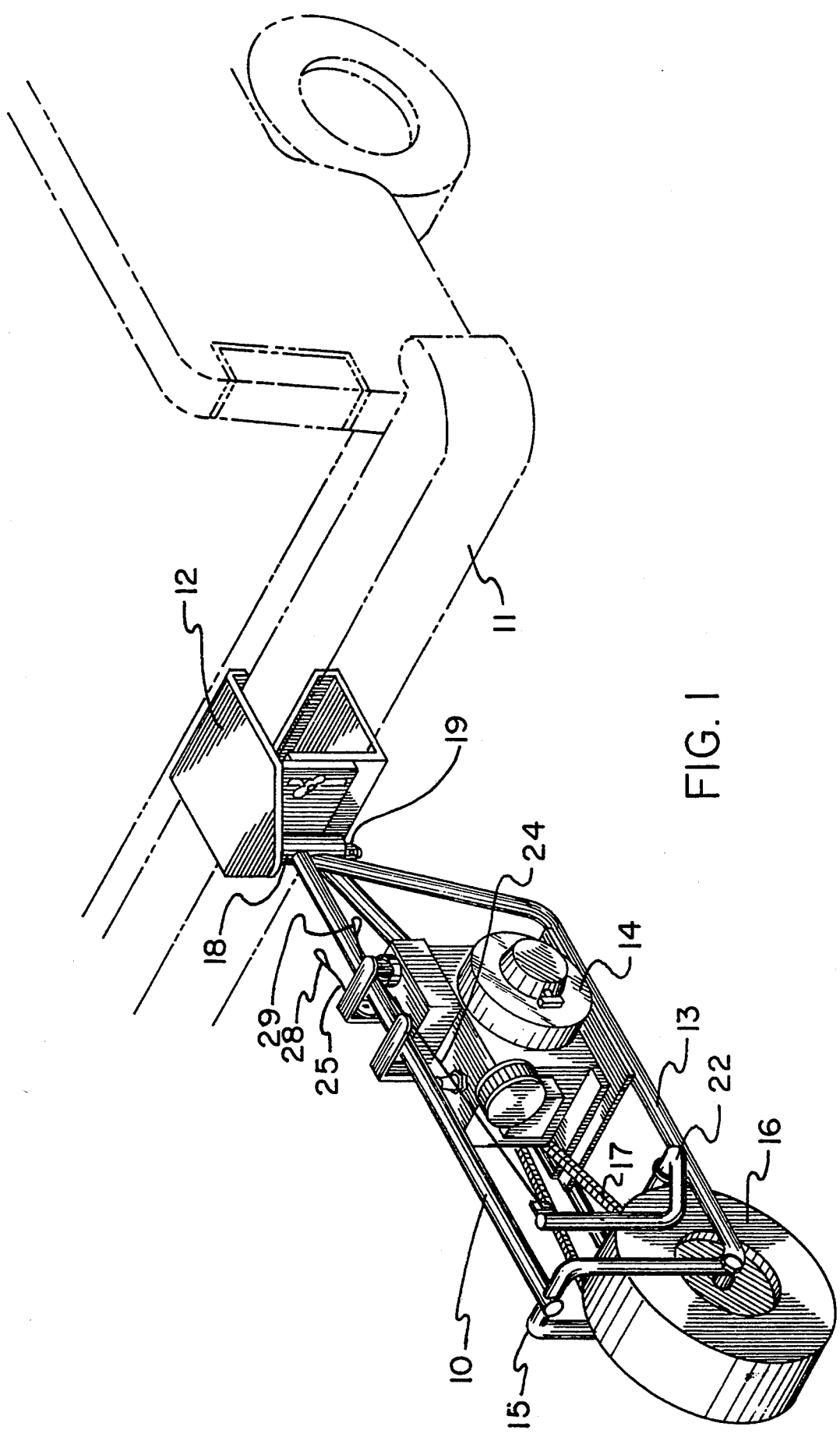
FIG. 1 is a perspective view of the device of the present invention showing it in operating relationship to a disabled vehicle.

With reference now to the drawings, and in particular to FIG. 1 thereof, a new and improved automobile emergency motive device embodying the principles and concepts of the present invention and generally designated by the reference numeral 10 will be described.

More specifically, it will be noted that the unit 10 comprises a uni-wheeled, motor powered unit affixed to the bumper 11 of a disabled vehicle by a clamping means designated generally as 12. The unit 10 has a rigid frame 13 supporting a gasoline motor 14 and having a yoke portion 15 at the rearward end thereof. Mounted to the frame 13 within the yoke portion 15 is a rotatable driving wheel 16. Operably connecting the motor 14 and the wheel 16 is a driving chain 17. Associated with such motor 14 and wheel 16 are throttle means 23 and brake means 22 with corresponding remote controls 24 and 25 respectively, as more fully described in connection with FIG. 2. The forward end of unit 10 terminates at and is connected pivotally to clamping means 12 by means of a drop-in cylindrical member 18 and associated locking pin 19, although obviously the manner of connecting the unit 10 to bumper 11 may be varied considerably.

Figure 2:
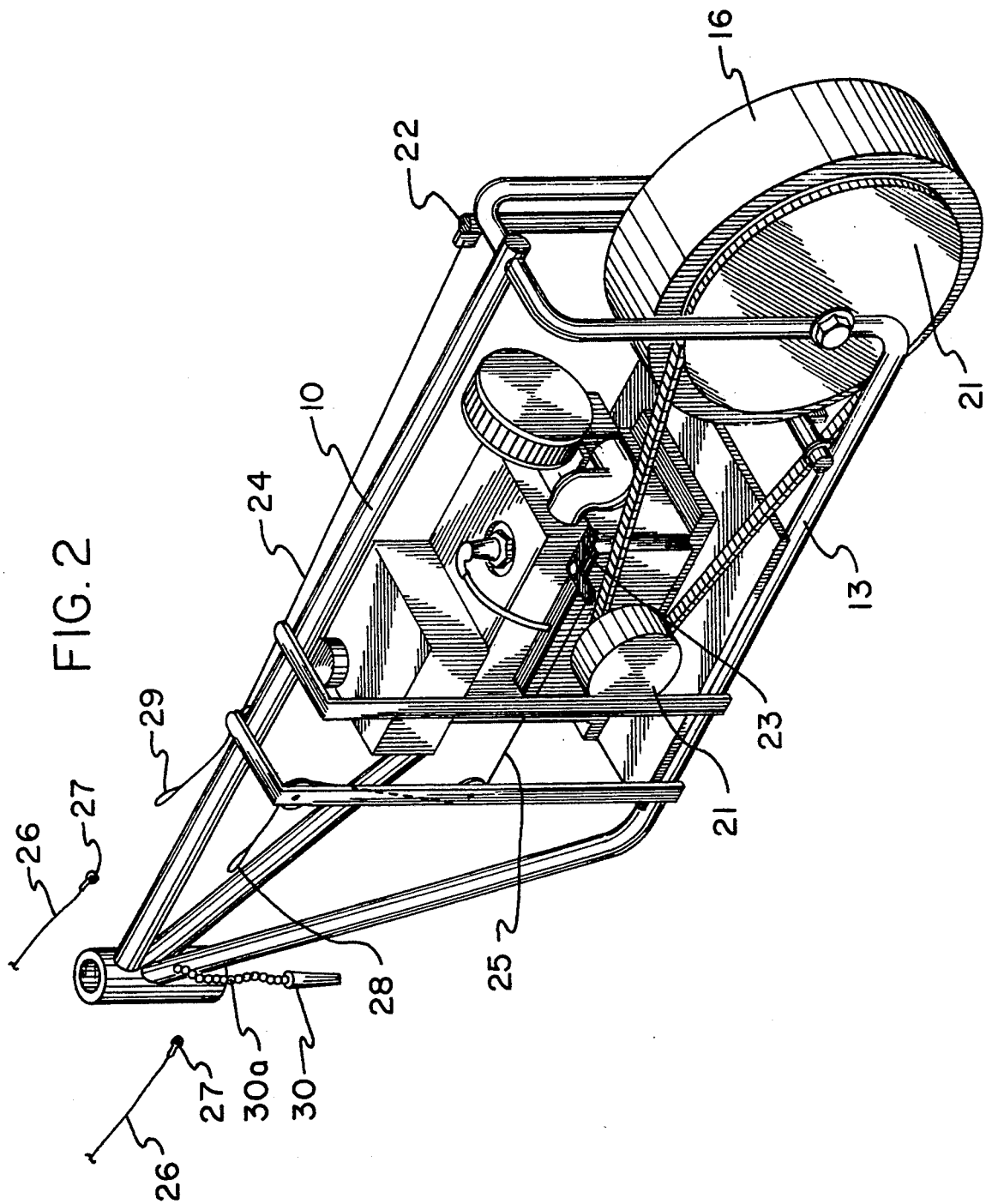
FIG. 2 is a perspective view of a preferred embodiment of the present invention.

Referring now to FIG. 2 the device of the present invention, disconnected from the bumper clamping means, is illustrated in more detail. Again the unit 10 has the frame 13 supporting motor 14 and wheel 16 and terminating at its forward end in means 20 (shown as an open tube welded to the end of frame 13) to receive a connection to the clamping means on the bumper of the vehicle. Obviously, if desired, the clamping means itself may be welded to the unit 10 and form a part thereof. Chain 17 is shown extending over and around sprockets 21 on the motor 14 and driven wheel 16. Preferably the sprocket has a 6:1 ratio or greater.

Remote controls for a spring retractable friction brake 22 on wheel 16 and throttle means 23 on motor 14 are provided at 24 and 25 respectively. These consist of flexible lines 24 and 25 attached to spring retractable throttle and brake engaging members 23 and 22. In either instance, the manually operable ends of controls 24 and 25 are brought forward within reach of the driver of the disabled car to which unit 10 is connected as by flexible lines 26 with a clip 27 thereon which engage with loops 28 and 29 formed in the ends of lines 24 and 25. Also shown in connection with the illustrated connecting means 20 between unit 10 and the clamping means to the bumper of the disabled vehicle is a locking pin 30 and associated fastening chain 30-A. The pin 30 is designed to secure the pivot pin from the clamping means (shown in more detail in FIGS. 3 and 4).

Referring now to FIG. 3 one type of clamping means 12 is illustrated. Designed to clamp directly to a bumper such as 11 in FIG. 1, a pair of vertically adjustable parallel clamping plates 31 and 32 are provided vertically space one from the other. The vertical adjustment is achieved by fastening bolts 33 and associated nuts 34 adapted to thread onto bolts 33. The bolts 33 are affixed to the lower parallel plate 32 while the upper of said plates 31 is provided with a vertically depending flange 35 having therein vertical slots 36 adapted to have bolts 33 passed therethrough and to be secured at the desired vertical displacement of plates 31 and 32 by tightening on said bolts 33 the nuts 34. The inner edges 37 of plats 31 and 32 are bent to secure around the inner edges of the bumper to which they will be attached. Also depending downwardly from upper plate 31 is a cylindrical pin or pivot member 38 adapted to be passed through the clamp engaging means 20 on unit 10 as is shown in FIGS. 1 and 2.

FIG. 4 illustrates a substitute clamping means 12 adapted for use with cars having a conventional ball-type bumper hitch thereon (either fixed permanently to the car or the detachable type used with many rental-vehicles). A female trailer ball hitch component 41 is provided along with a conventional clamping lever 42 therefor. Extending parallel to the ground (when in use) from the female hitch component 41 is a plate or arm 43 to which is fastened a downwardly extending pivot or cylindrical pin 44 adapted to be passed through the clamp engaging means 20 on unit 10 as shown in FIGS. 1 and 2. This pin 44 as well as the corresponding pin 38 in FIG. 3 is provided with a circular opening 45 extending therethrough to receive the locking pin 30 shown in FIG. 2. Likewise, a conventional hide-away hitch (female portion) may be installed under the allowing the male portion of such hitch to be attached to the unit 10 and to be slid into place and fastened with a pin.

While the present invention requires as an essential component thereof a means to secure the driving unit to the bumper of the disabled car with which it is to be used, the particular clamping means is not critical to the invention described and claimed herein. For example, the connecting pin between the driving unit and the clamp may extend upwardly to insert into the complimentary member on such driving unit or the clamping means may be formed as a portion of such driving unit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An automobile emergency accessory for use with an automobile, said accessory comprising:

a rigid frame having a rearward end and a forward end with a yoke portion formed at said rearward end and a cylindrical member coupled to said forward end thereof;

a gasoline motor mounted to said rigid frame, said motor having a throttle means for controlling a speed of said motor, said motor further having a motor sprocket;

a driving wheel rotatably mounted within said yoke portion of said frame, said wheel having a wheel sprocket;

a driving chain mechanically coupling the motor and the driving wheel, said chain extending over said motor sprocket and said wheel sprocket;

brake means coupled to said frame and operable to retard a rotational motion of said driving wheel relative to said frame;

a first remote control having a first flexible line attached to said throttle means, said first flexible line having a manually operable end thereof which extends forward to within reach of a driver of the automobile;

a second remote control having a second flexible line attached to said brake means, said second flexible line having a manually operable end thereof which extends forward to within reach of a driver of the automobile;

clamping means for coupling said accessory directly to a bumper, said clamping means comprising first and second spaced, vertically adjustable parallel clamping plates, said first plate having a vertically depending flange with a pair of spaced, vertical slots extending through said flange, said second plate having a pair of spaced fastening bolts extending therefrom and positioned for projection through said slots for securement by a pair of nuts each adapted to thread onto an individual one of said fastening bolts to secure said plates at a desired vertical displacement, said plates each further having an inner edge downwardly bent and arranged for securement around inner edges of said bumper; and a pivot member extending downwardly from said first plate and arranged for reception within said cylindrical member of said frame.

2. The automobile emergency accessory of claim 1, wherein a diameter ratio of said wheel sprocket relative to said motor sprocket is approximately equal to at least 6:1.

3. The automobile emergency accessory of claim 2, wherein said brake means is a spring retractable friction brake.

4. An automobile emergency accessory for use with an automobile, said accessory comprising:

a rigid frame having a rearward end and a forward end with a yoke portion formed at said rearward end and a cylindrical member coupled to said forward end thereof;

a gasoline motor mounted to said rigid frame, said motor having a throttle means for controlling a speed of said motor, said motor further having a motor sprocket;

a driving wheel rotatably mounted within said yoke portion of said frame, said wheel having a wheel sprocket;

a driving mechanically coupling the motor and the driving wheel, said chain extending over said motor sprocket and said wheel sprocket;

brake means coupled to said frame and operable to retard a rotational motion of said driving wheel relative to said frame;

a first remote control having a first flexible line attached to said throttle means, said first flexible line having a manually operable end thereof which extends forward to within reach of a driver of the automobile;

a second remote control having a second flexible line attached to said brake means, said second flexible line having a manually operable end thereof which extends forward to within reach of a driver of the automobile;

clamping means for coupling said accessory to a ball hitch, said clamping means comprising a female trailer ball hitch component having a clamping lever for securing said female trailer ball hitch component to said ball hitch; an arm extending from said female trailer ball hitch component; a cylindrical pin extending downwardly from said arm and arranged for reception within said cylindrical member of said frame.

5. The automobile emergency accessory of claim 4, wherein a diameter ratio of said wheel sprocket relative to said motor sprocket is approximately equal to at least 6:1.

6. The automobile emergency accessory of claim 5, wherein said brake means is a spring retractable friction brake.

* * * * *